United States Patent
Nishioka

(10) Patent No.: US 6,478,595 B2
(45) Date of Patent: Nov. 12, 2002

(54) CARD CONNECTOR CAPABLE OF DETECTING THAT CARD HAS BEEN HELD IN CARD MOUNTING POSITION

(75) Inventor: Toru Nishioka, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 10/066,050

(22) Filed: Jan. 31, 2002

(65) Prior Publication Data
US 2002/0119688 A1 Aug. 29, 2002

(30) Foreign Application Priority Data

Feb. 26, 2001 (JP) ........................................ 2001-050439

(51) Int. Cl.$^7$ ............................................. H01R 29/00
(52) U.S. Cl. ..................... 439/188; 439/159; 439/346; 439/377; 439/489; 439/630; 439/945; 439/946
(58) Field of Search ................................. 439/188, 489, 439/180, 377, 630, 862, 945, 946, 159, 160, 155, 346

(56) References Cited

U.S. PATENT DOCUMENTS

| | | | |
|---|---|---|---|
| 5,575,669 A | | 11/1996 | Lin et al. |
| 5,688,134 A | * | 11/1997 | Hirata ........................ 439/136 |
| 5,695,351 A | * | 12/1997 | Kimura et al. .............. 439/159 |
| 5,775,937 A | | 7/1998 | Bricaud et al. |
| 5,899,763 A | * | 5/1999 | Kajiura ....................... 439/159 |
| 6,074,227 A | * | 6/2000 | Ho et al. .................... 439/159 |
| 6,126,464 A | * | 10/2000 | Chang ........................ 439/188 |
| 6,129,570 A | * | 10/2000 | Griffin et al. ............... 439/260 |
| 6,146,182 A | | 11/2000 | Wang et al. |
| 6,155,853 A | * | 12/2000 | Kajiura ....................... 439/159 |
| 6,342,684 B1 | * | 1/2002 | Myojin ........................ 200/52 |
| 6,390,836 B1 | * | 5/2002 | Motegi et al. .............. 439/159 |
| 6,399,906 B1 | * | 6/2002 | Sato et al. ................. 200/61.59 |

FOREIGN PATENT DOCUMENTS

| | | |
|---|---|---|
| DE | 19521360 | 6/1995 |
| EP | 0554071 | 8/1993 |
| EP | 0769829 | 4/1997 |
| EP | 200340293 | 8/2000 |

* cited by examiner

Primary Examiner—P. Austin Bradley
Assistant Examiner—Truc Nguyen
(74) Attorney, Agent, or Firm—Beyer Weavewr & Thomas

(57) ABSTRACT

The present invention comprises: a sliding member that can move slidably in directions in which a card mounted in or dismounted from a housing is inserted and ejected; a return spring for energizing the sliding member in a card ejection direction; a locking member for holding the sliding member in a position in which the card is mounted, against an energizing force of the return spring; and fixed contacts, wherein the locking member is formed from an elastically deformable plate spring, and the plate spring is formed with an anchor for anchoring the sliding member, and moving contacts that can contact or separate from the fixed contacts, wherein the moving contacts are actuated in accordance with engagement and disengagement between the sliding member and the locking member, and wherein it is detected that the card has been held in a mounting position when the sliding member has been anchored to the anchor of the locking member.

6 Claims, 12 Drawing Sheets

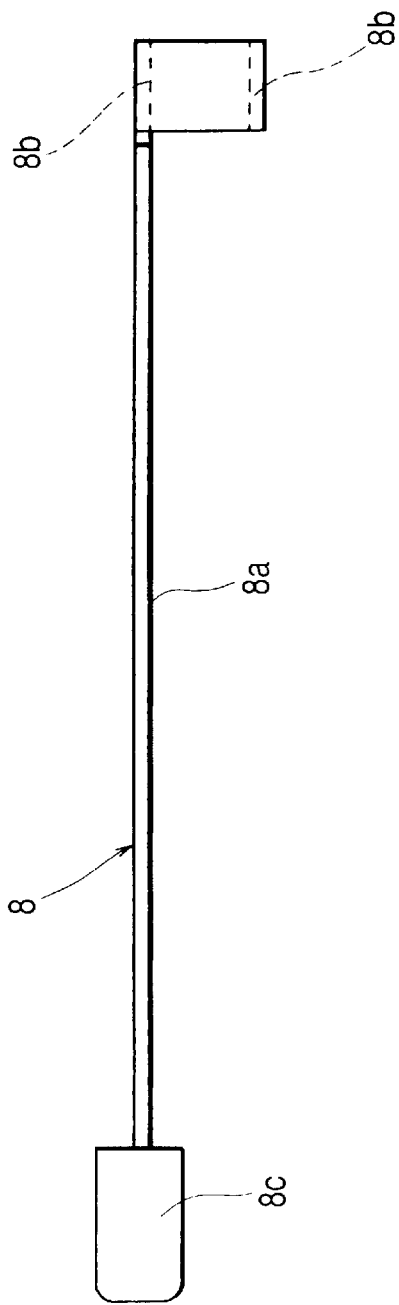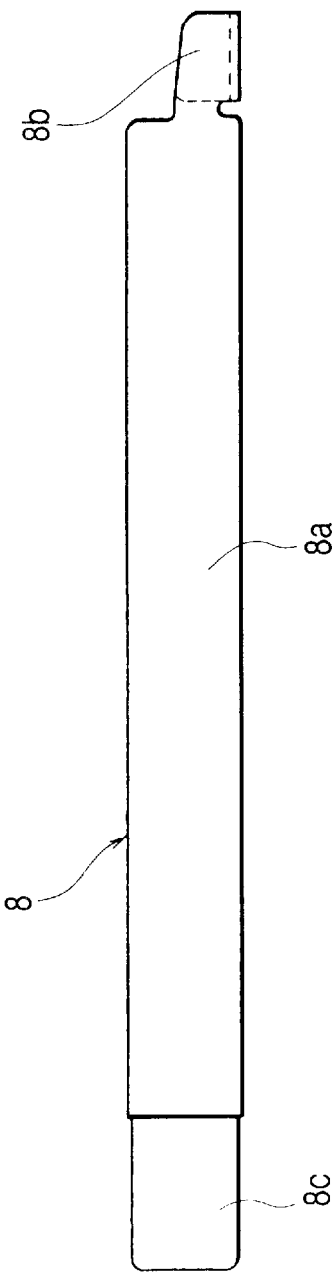

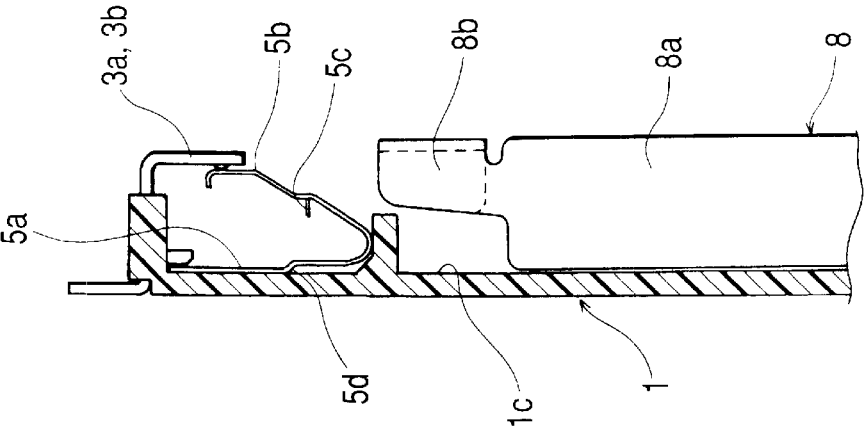
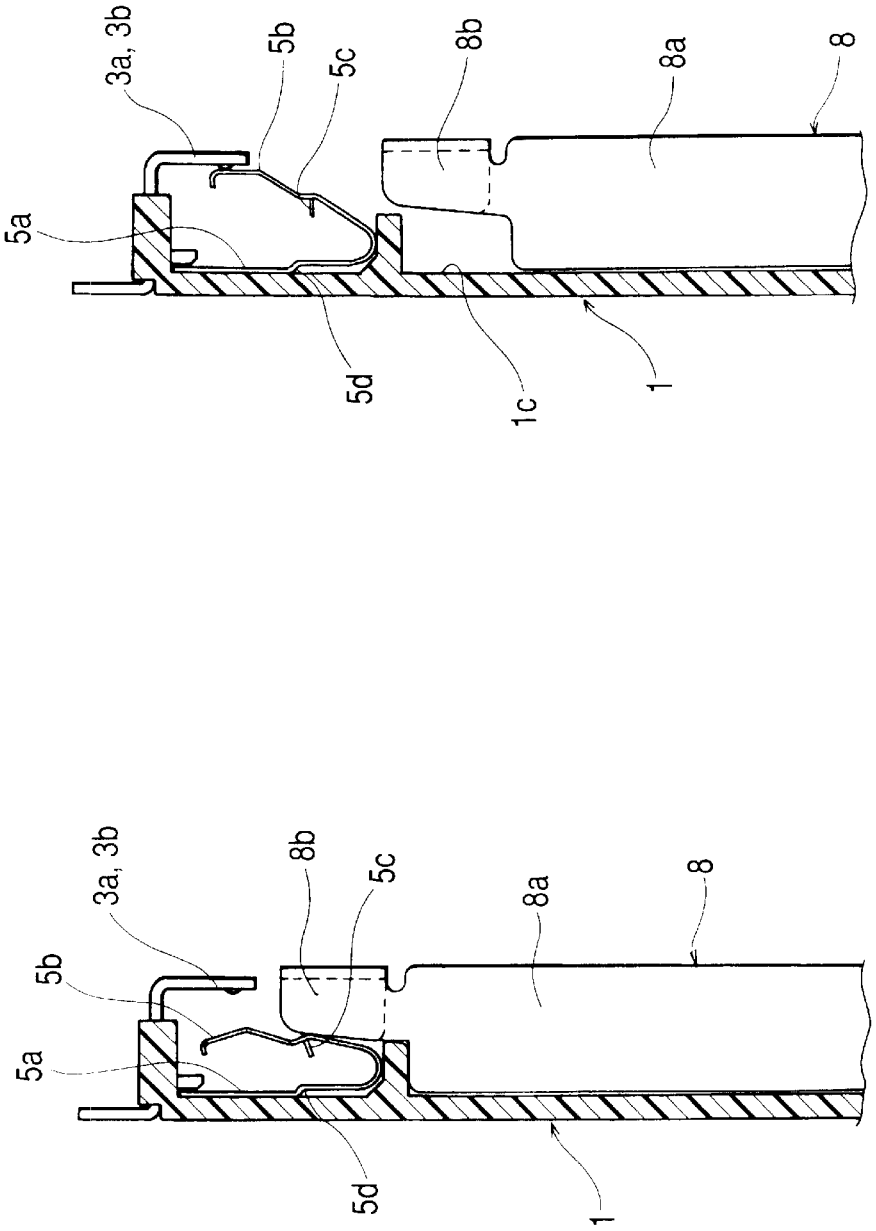

CARD CONNECTOR CAPABLE OF DETECTING THAT CARD HAS BEEN HELD IN CARD MOUNTING POSITION

BACKGROUND OF THE INVENTION

1. Field of the Invention

The present invention relates to the construction of a card connector used for an IC card used as a storage medium of a personal computer or the like, and a compact flash (CF) card used in electronic equipment such as digital cameras.

2. Description of the Prior Art

An IC card connector is generally used as an additional recording apparatus of personal computers. The IC card is widely used as a storage medium of the IC card connector.

The IC card is mounted in the IC card connector to write and read necessary information. To increase the operability of mounting and dismounting the IC card, some IC card connectors have a mechanism of ejecting the IC card and a locking member for locking an IC card to be mounted in a mounting position. Also, to correctly perform reading and writing from and to an IC card, some card connectors detect that the IC card has been locked in a mounting position, before reading or writing data from or to the IC card.

The conventional IC card connector has a sliding member that moves in insertion or ejection direction along with the mounting or dismounting of an IC card, wherein the sliding member has an engaging arm engaged with an engaging part of the IC card. The engaging arm is engaged with the IC card when it is mounted or dismounted, and when the IC card is inserted, the sliding member is moved in the insertion direction as the IC card moves in the insertion direction.

Another conventional IC connector has a locking member for holding a sliding member in an IC card mounting position, a push rod for unlocking the locking member, and a spring member for energizing the sliding member in an ejection direction when the locking member is unlocked, wherein, when the IC card is ejected as the sliding member moves in the ejection direction, the IC card is pushed out in the ejection direction by the energizing force of the spring member.

A known conventional IC card lock detection mechanism is constructed so that a detection switch is provided within a housing, and when an IC card is inserted in the housing and has been locked in a mounting position, the detection switch is pushed by the mounted IC card, whereby it is detected that the IC card has been locked in the mounting position.

However, in the construction of the above-described conventional IC card connectors, a locking mechanism is provided to lock an IC card in a mounting position when it is mounted, and to correctly perform reading and writing from and to the IC card, a detection mechanism for detecting that the IC card has been locked in the mounting position is provided in addition to the locking mechanism. Consequently, the number of parts increases, complicating the connector construction and upsizing the connector. This has been a problem of conventional IC card connectors.

SUMMARY OF THE INVENTION

The present invention solves the above-described problem and provides a card connector that has a card locking mechanism and a lock detection mechanism to lock a card and detect that the card has been locked, with a simple construction, without increasing the number of parts.

To solve the above-described problem, as first means, the present invention comprises: a sliding member that can move slidably in directions in which a card mounted in or dismounted from a housing is inserted and ejected; a return spring for energizing the sliding member in a card ejection direction; a locking member for holding the sliding member in a position in which the card is mounted, against an energizing force of the return spring; and fixed contacts, wherein the locking member is formed from an elastically deformable plate spring, which is formed with an anchor for anchoring the sliding member, and moving contacts that can contact or separate from the fixed contacts, wherein the moving contacts are actuated in accordance with engagement and disengagement between the sliding member and the locking member, and wherein it is detected that the card has been held in a mounting position when the sliding member has been anchored to the anchor of the locking member.

As second means, the present invention is characterized in that fixed contacts opposite to the moving contacts are formed in the housing, and as the sliding member moves to a card mounting position, the sliding member pushes the plate spring so that the moving contacts and the fixed contacts contact or separate from each other.

As third means, the present invention is characterized in that the fixed contacts consist of first and second fixed contacts, and the moving contacts contact or separate from the first and second contact as the sliding member moves.

As fourth means, the present invention is characterized in that the locking member is formed from a U-shaped metal plate, one piece thereof disposed at an upper face side is bifurcated opposite to the first and second fixed contacts, and the anchor is formed in the bifurcated notch.

As fifth means, the present invention is characterized in that the locking member is bent to the U-character shape so that one piece thereof disposed at the upper face side is elastically deformable, and another piece thereof disposed at a lower face side is provided with a step bent upward, which provides a gap from the housing so that the other piece can deform elastically.

As sixth means, the present invention is characterized in that a push rod is provided which is disposed so as to move slidably in card insertion and ejection directions and unlocks the locking member to move the sliding member to a card ejection position by a push operation, and the locking member is pushed at one end of the push rod so as to be elastically deformed, whereby a lock between the sliding member and the anchor is undone.

BRIEF DESCRIPTION OF THE DRAWINGS

Preferred embodiments of the present invention will be described in detail based on the followings, wherein:

FIG. 11 is a plan view showing a push rod of the present invention;

FIG. 12 is a side view showing the push rod;

FIG. 24 is a drawing showing the state in which the sliding member is unlocked to be returned and a card is being ejected; and FIG. 25 is a drawing showing the state in which, when the card is being ejected, the push rod returns to its initial position upon return of the sliding member.

DESCRIPTION OF THE PREFERRED EMBODIMENTS

Figure 1:
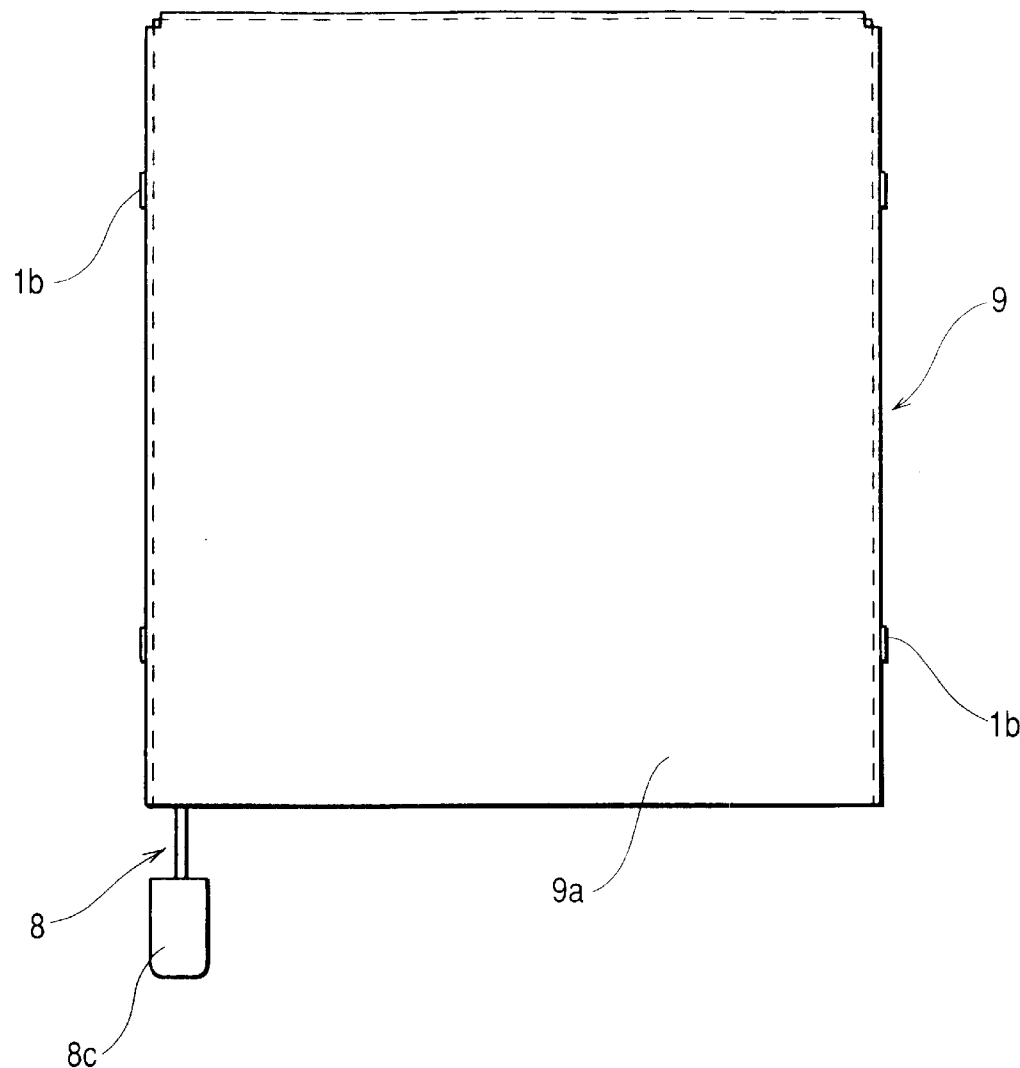
FIG. 1 is a plan view showing a card connector according to one embodiment of the present invention.
Figure 2:
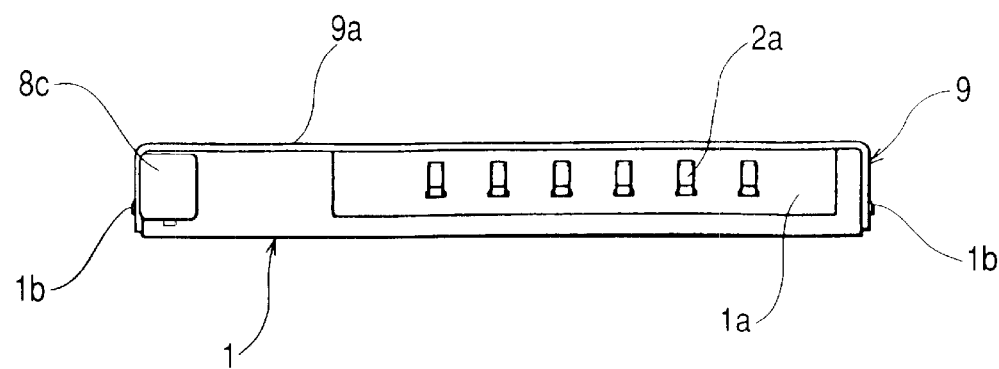
FIG. 2 is a front view showing the card connector.
Figure 3:
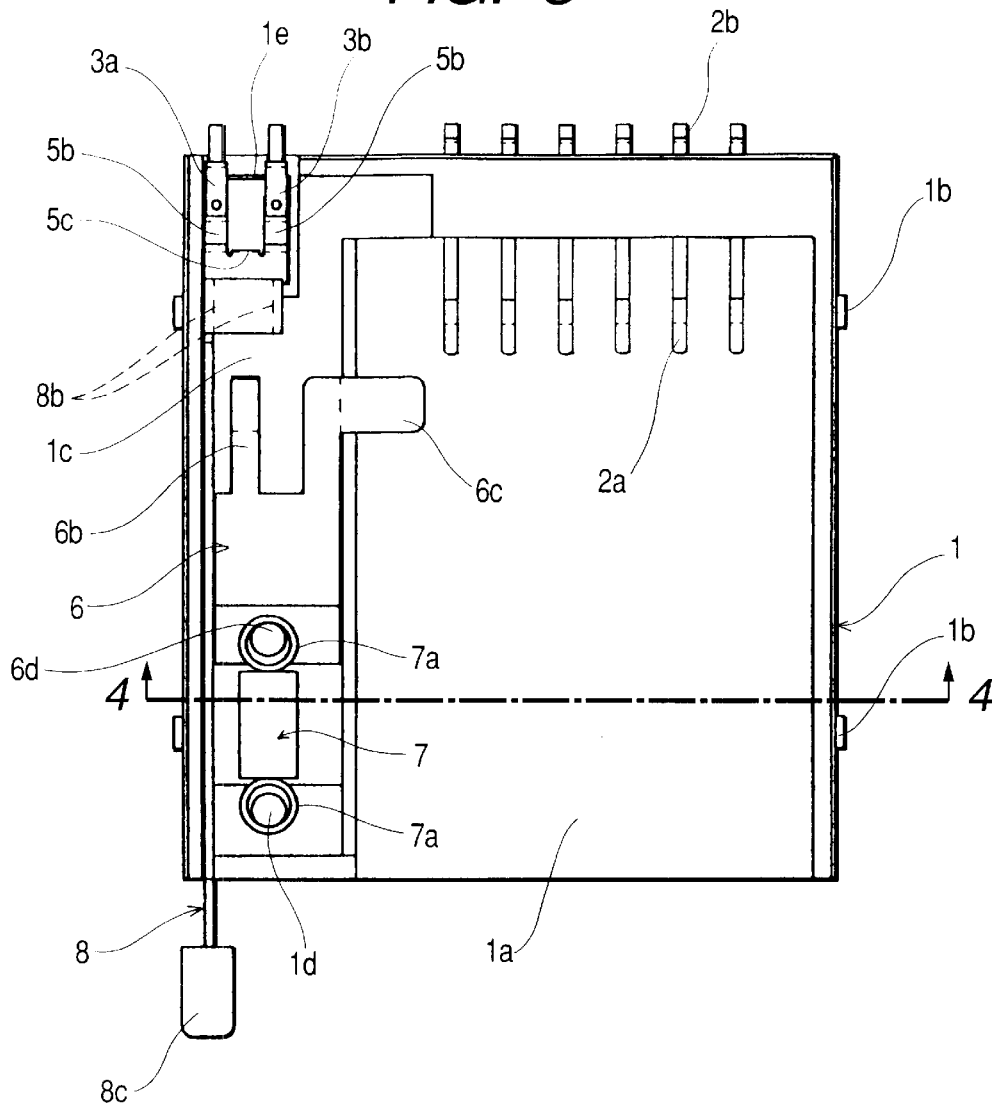
FIG. 3 is a plan view showing the card connector when a cover thereof is removed.
Figure 4:
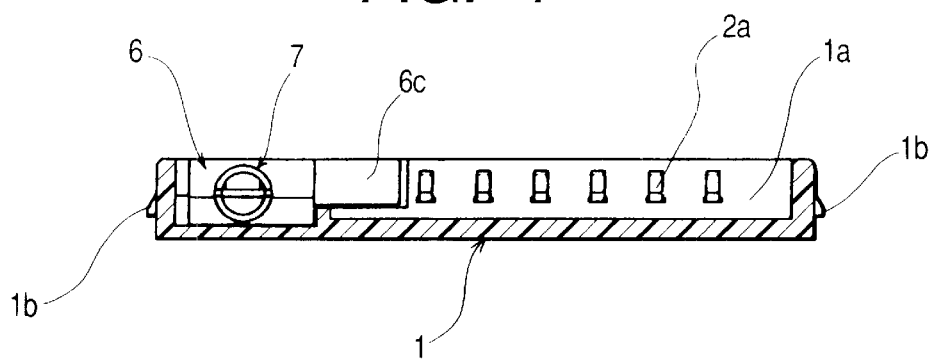
FIG. 4 is a sectional view taken along line 4—4 in FIG. 3.
Figure 5:
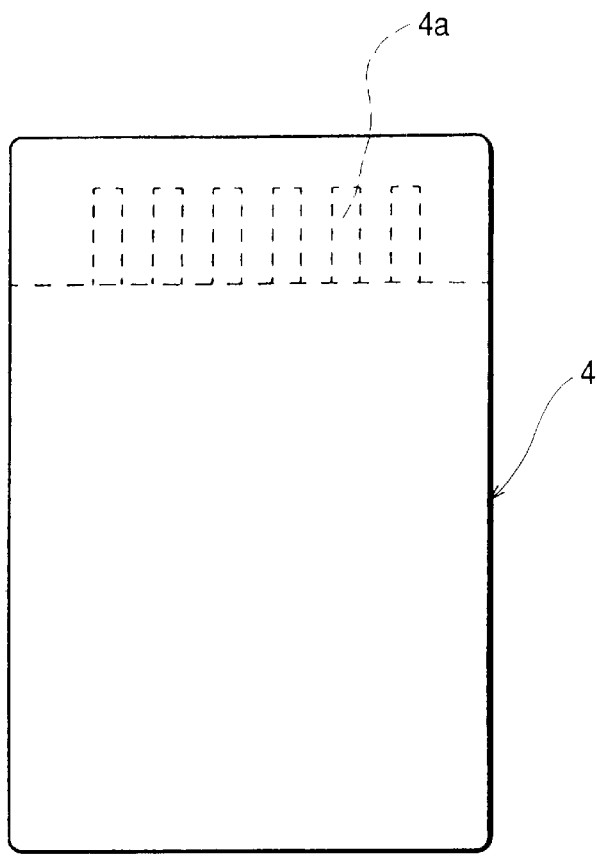
FIG. 5 is a plan view showing a card of the present invention.
Figure 6:
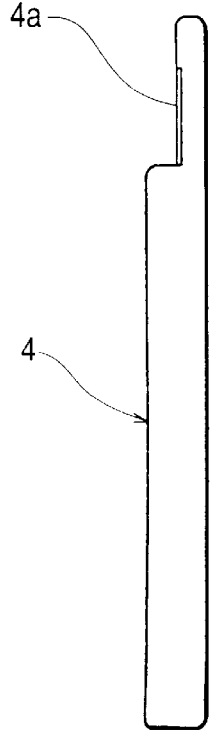
FIG. 6 is a side view showing the card.
Figure 7:
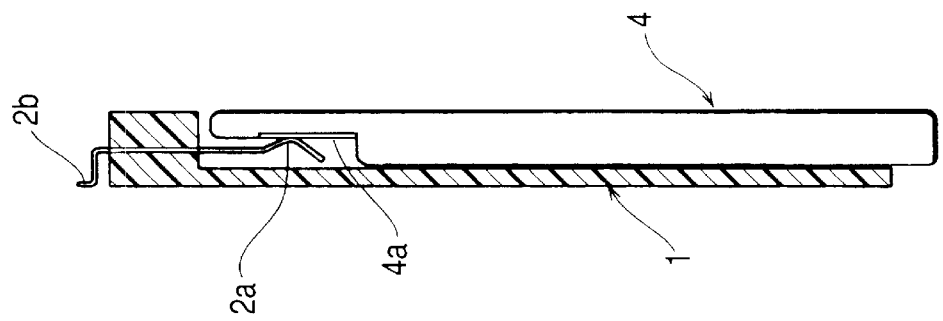
FIG. 7 is a drawing showing the state of connection with connector terminals before the card is inserted.
Figure 8:
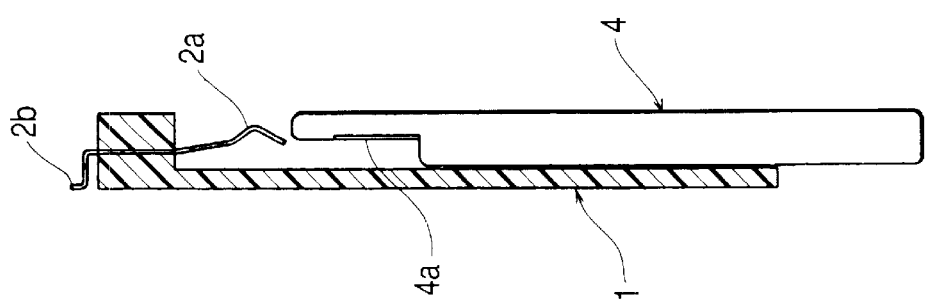
FIG. 8 is a drawing showing the state of connection with connector terminals when the card has been mounted.
Figure 9:
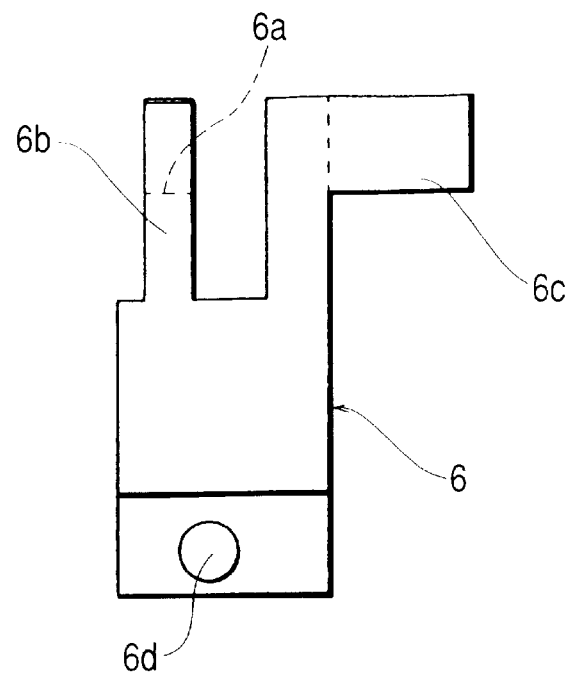
FIG. 9 is a front view showing a sliding member of the present invention.
Figure 10:
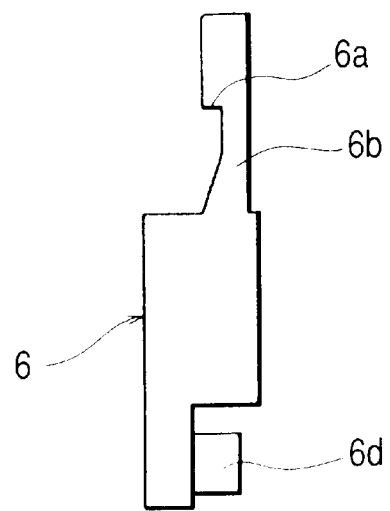
FIG. 10 is a side view showing the sliding member.
Figure 13:
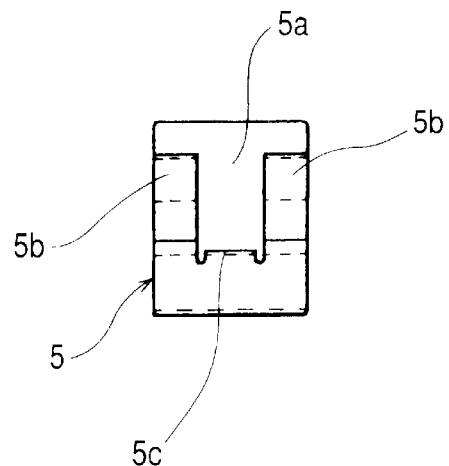
FIG. 13 is a plan view showing a locking member of the present invention.
Figure 14:
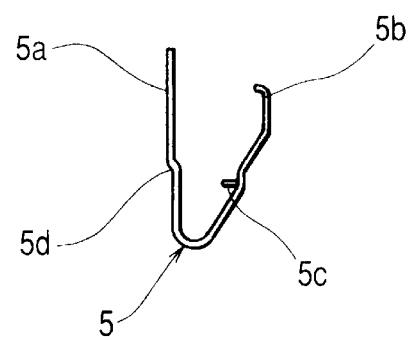
FIG. 14 is a side view showing the locking member.
Figure 15:
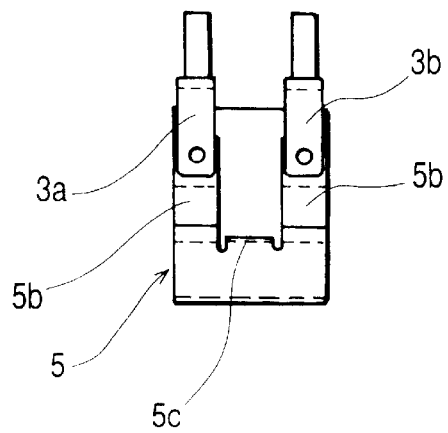
FIG. 15 is a plan view showing a detection switch of the present invention.
Figure 16:
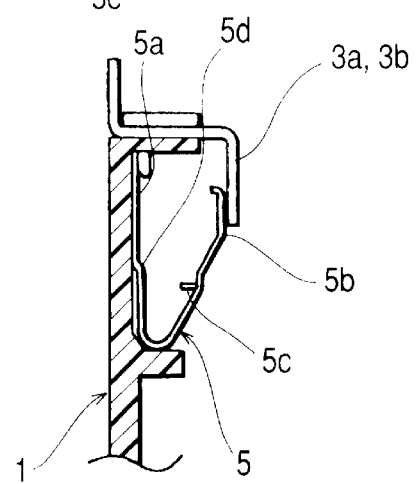
FIG. 16 is a sectional view showing the detection switch attached to a housing of the present invention.
Figure 17:
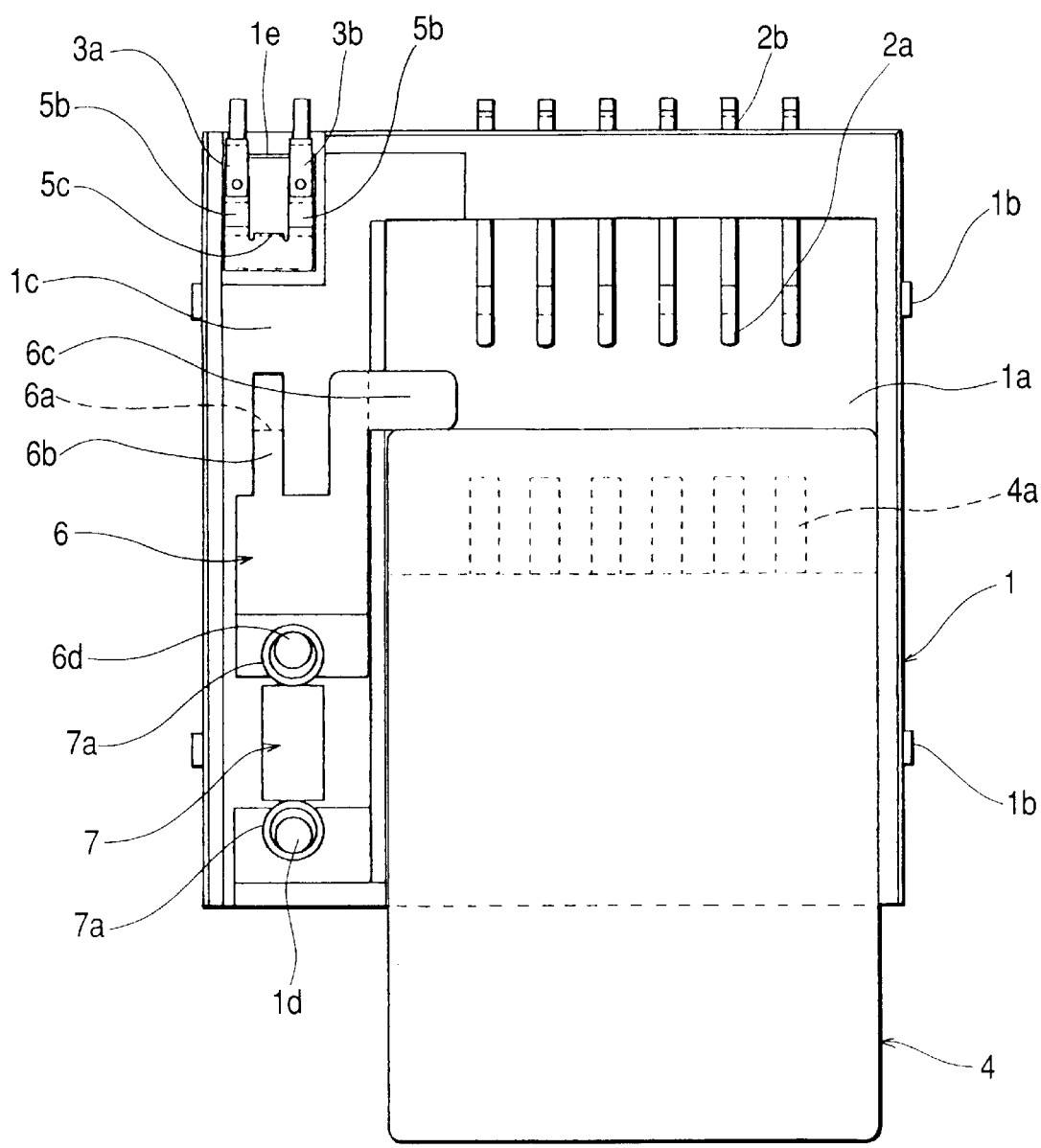
FIG. 17 is a drawing showing the card connector before a card is inserted.
Figure 18:
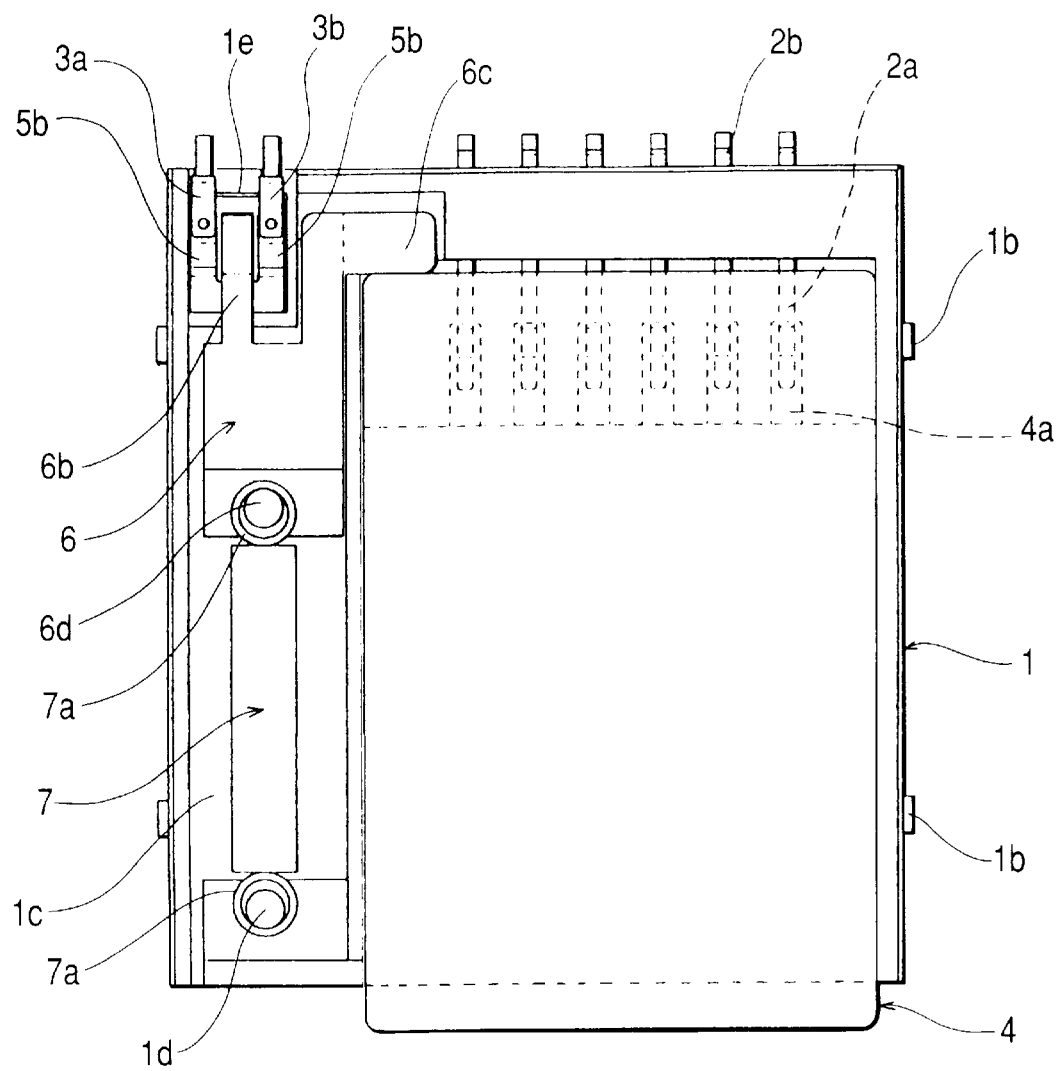
FIG. 18 is a drawing showing the card connector when the card has been mounted.

Hereinafter, one embodiment of the present invention is shown in FIGS. 1 to 18. FIG. 1 is a plan view showing a card connector of the present invention, FIG. 2 is a front view of the same, FIG. 3 is a plan view of the same when a cover thereof is removed, FIG. 4 is a sectional view taken along line 4—4 in FIG. 3, FIG. 5 is a plan view of a card, FIG. 6 is a side view of the same, FIG. 7 is a drawing showing the state of connection with connector terminals before the card is inserted, FIG. 8 is a drawing showing the state of connection with connector terminals when the card has been mounted, FIG. 9 is a front view of a sliding member, FIG. 10 is a side view of the same. FIG. 11 is a plan view of a push rod, FIG. 12 is a side view of the same, FIG. 13 is a plan view of a locking member, FIG. 14 is a side view of the same, FIG. 15 is a plan view of a detection switch, FIG. 16 is a sectional view of the detection switch attached to a housing, FIG. 17 is a drawing showing the card connector before a card is inserted, and FIG. 18 is a drawing showing the card connector when the card has been mounted.

In the drawings, a housing 1 is made of an insulating material such as synthetic resin and formed into an almost square shape. The housing 1 is provided with an internal housing part 1a in which a card 4 described later is inserted. In an inner bottom of the housing part 1a, plural contact terminals 2a made of a conductive metal material are disposed, and at the other ends of the contact terminals 2a, contact terminals 2b are formed which are guided outward from the housing 1 and connected with a circuit pattern such as an external circuit board not shown.

At the circumference of the housing 1, plural engaging claws 1b engaging with a cover 9 described later are provided.

At one end of the housing 1, a concave flat part 1c is provided contiguous to the housing part 1a, and a sliding member 6 described later is movably disposed in the flat part 1c. At a lower end of the flat part 1c, a spring anchoring protrusion 1d to which a return spring 7 is anchored is provided, and at an upper end of the flat part 1c, an anchoring groove 1e for anchoring a locking member 5 described later is provided. At an upper end of the anchoring groove 1e, first and second fixed contacts 3a and 3b constituting part of a detection switch are disposed in parallel at an fixed interval, and at one side of the housing 1, a push rod 8 described later is slidably guided.

A card 4, having an integrated circuit (IC) housed inside it, is widely used as a storage medium. Plural contacts 4a, formed at one end of the bottom of the card 4, are brought into contact with plural contact terminals 2a provided in the housing part 1a of the housing 1 to perform various types of information processing with electronic equipment connected to the outside. FIGS. 7 and 8 show a state in which the card 4 is inserted in the housing 1 so that the contacts 4a of the card 4 contact the contact terminals 2a.

The locking member 5 is formed in a U-character shape from a conductive metal plate such as an elastically deformable plate spring. The locking member 5 is constituted by a flat base 5a anchored to the anchoring groove 1e of the housing 1 and moving contacts 5b bent to the U-character shape and elongated to the upper face side from the base 5a. The moving contacts 5b are bifurcated and their tips are opposite to the first and second fixed contacts 3a and 3b so that they contact or separate from the first and second fixed contacts 3a and 3b.

At a central notch formed by splitting into the bifurcated shape, an anchor 5c comprising a bent piece bent downward is formed, and a hooked engaging protrusion 6a of the sliding member 6 described later is engaged in or disengaged from the anchor 5c.

At the flat base 5a, a step 5d bent upward is formed. Providing the step 5d forms a gap between the housing 1 and the vicinity of a U-shaped bent portion of the base 5a. By this construction, as the moving contacts 5b disposed at the upper face side deforms elastically, the lower face of the U-shaped bent portion at the base 5a can also be formed so as to deform elastically. This makes firmer the engagement between a hooked engaging protrusion 6a of the sliding member 6 described later and the anchor 5c of the locking member 5.

The locking member 5 is integrated with the anchor 5c that engages with or disengages from the sliding member 6 described later in accordance with its elastic deformation, and the moving contacts 5b that deform elastically together with the anchor 5c and thereby contact and separate from the first and second fixed contacts 3a and 3b. By this construction, a locking mechanism of the sliding member 6 described later and a detection mechanism for detecting a lock can be formed of one part, contributing to reduction in the number of parts and simplicity of construction, and increasing assembly capability.

The bifurcate moving contacts 5b are formed in the locking member 5 and a central notch formed by splitting into the bifurcated shape is formed as the anchor 5c. Thereby, with a simple construction, the engaging protrusion 6a of the sliding member 6 described later can be anchored without fail.

The fixed contacts 3a and 3b and the moving contacts 5b that constitute the detection switch are formed so that a pair of fixed contacts 3a and 3b are parallel to each other and the bifurcate moving contacts 5b are disposed to be opposite to them. By this construction, even if the moving contacts 5b elastically deform in tilted position, the multiple contacts at their tips ensure stable contact.

The sliding member is made of an insulating material such as synthetic resin, and at one end of the sliding member 6, an engaging arm 6b having the engaging protrusion 6a engaged with the anchor 5c of the locking member 5 is provided. An L-shaped card abutment 6c is formed in parallel to the engaging arm 6b, and the card abutment 6c is abutted against a front edge of the card 4, whereby the sliding member 6 moves along with the insertion and ejection of the card 4.

At the other end of the sliding member 6 opposite to the engaging arm 6b and the card abutment 6c, a spring anchoring protrusion 6d is formed to which one end of a return spring 7 described later anchored to the housing 1 is anchored.

The sliding member 6, disposed within the housing 1, is energized by the return spring 7 so that it can move in vertical direction within the housing 1, that is, in directions in which the card 4 is inserted and ejected.

The return spring 7 is comprised of a coiled tension spring and has a pair of catches 7a an 7b formed at both ends thereof. The catches 7a an 7b are hung by the spring anchoring protrusion 1d of the housing 1 and the spring anchoring protrusion 6d of the sliding member 6 to energize the sliding member 6 in a direction in which the card is ejected.

The push rod 8, formed by bending a thin metal plate, has a rectangular substrate 8a and a pair of operation pieces 8b that are bent to the U-character shape at one end of the substrate 8a and are opposite to each other. The pair of operation pieces 8b are formed to have the same interval therebetween as the moving contacts 5b formed in the bifurcate shape on the upper face of the locking member 5.

The pair of operation pieces 8b abut and push the moving contacts 5b formed on the upper face of the locking member 5, whereby the locking member 5 is elastically deformed toward the lower face thereof. Consequently, the anchor 5c of the locking member 5 is disengaged from the engaging part 6a of the sliding member 6.

A push button 8c operated with human fingers is mounted at the other end of the substrate 8a. The push rod 8 is incorporated in the housing 1 together with the sliding member 6, and the substrate 8a is guided by the housing 1 so as to move within the housing 1.

In the above-described construction, to disengage the locking member 5 from the sliding member 6, by pushing the upper face of the locking member 5 toward the lower face thereof with one end of the push rod 8 to elastically deform the locking member 5, the engaging protrusion 6a of the sliding member 6 is disengaged from the anchor 5c of the locking member 5 to undo the lock. As a result, the construction is simplified and the lock can be easily undone.

The cover 9, made of a metallic plate material, has a flat upper plate 9a and side plates bent at right angles to the upper plate 9a, the side plates each having plural anchoring windows (not shown) engaged with the engaging claws 1b of the housing 1. The cover 9 is installed in the upper face of the housing 1 to cover an open area of the housing 1.

The detection switch comprised of a pair of the fixed contacts 3a and 3b and the bifurcate moving contacts 5b are formed from conductive metal plates disposed opposite to each other. The fixed contacts 3a and 3b and the moving contacts 5b are disposed with their respective tips being in connection (contact) with each other. Although, in this case, the contacts are in normal close (on) state, they may be in normal open (off) state from the beginning.

Although the pair of the fixed contacts 3a and 3b are connected (short-circuited) with the moving contacts 5b to turn the switch on, connection (conduction) may be made between one fixed contact and one moving contact.

In the detection switch, when the locking member 5 is elastically deformed toward the lower face as the sliding member 6 moves, the moving contacts 5b provided in the locking member 5 are also elastically deformed toward the lower face and are temporarily disengaged from the fixed contacts 3a and 3b, so that the switch goes off. Further, when the sliding member 6 is locked by the anchor 5c of the locking member 5, the locking member 5 having been elastically deformed toward the lower face returns to its original state, and the moving contacts 5b contact the fixed contacts 3a and 3b to turn the switch on. By detecting off and on signals of the contacts at this time, it is detected that a card has been locked in a mounting position.

The operation of the above-described card connector is described with reference to FIGS. 17, 18, and 19 to 25.

Figure 19:
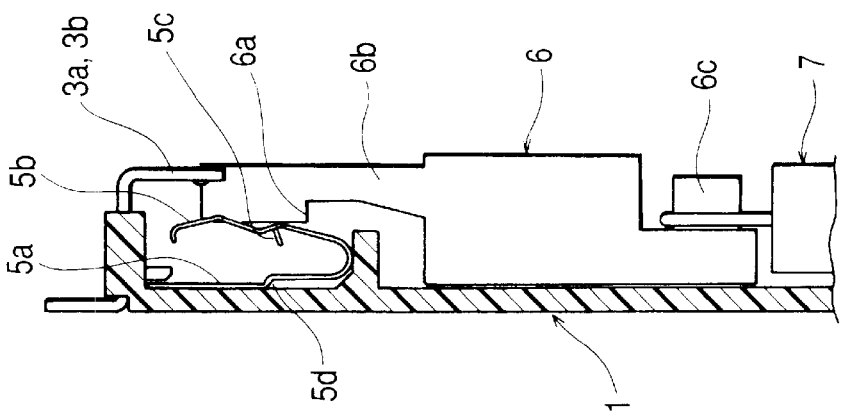
FIG. 19 is a drawing showing the engagement between the sliding member of the card connector and the locking member when the card is being inserted in the housing.
Figure 20:
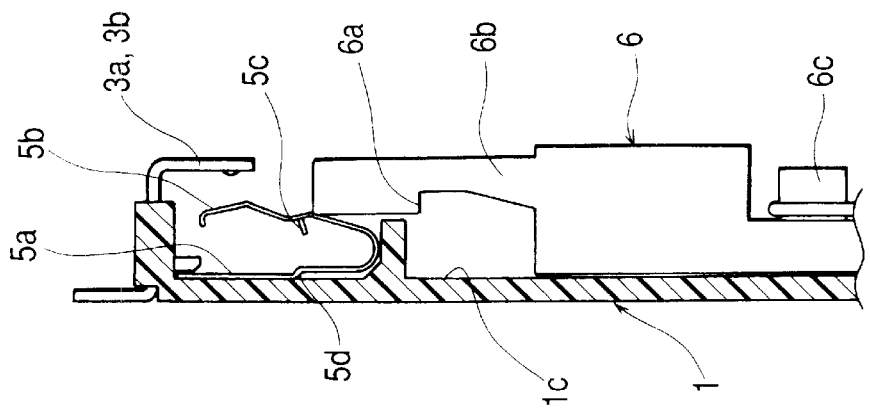
FIG. 20 is a drawing showing the detection switch turned off when the card is being inserted in the housing.
Figure 21:
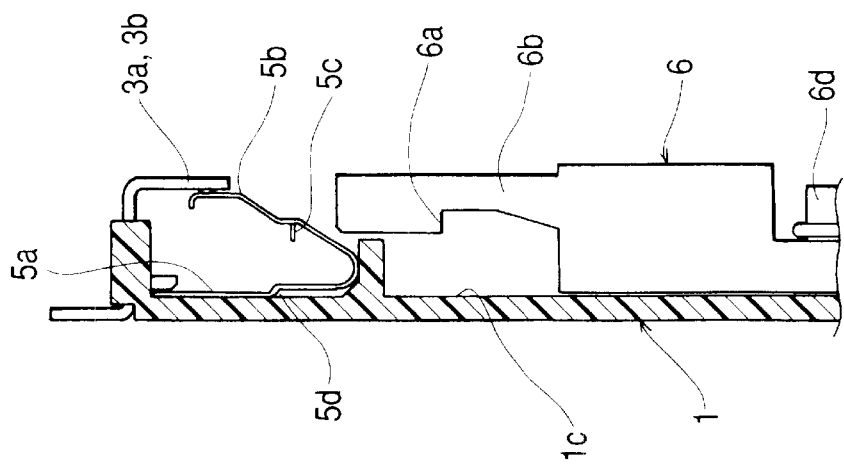
FIG. 21 is a drawing showing the detection switch turned off when the card is being inserted in the housing.
Figure 22:
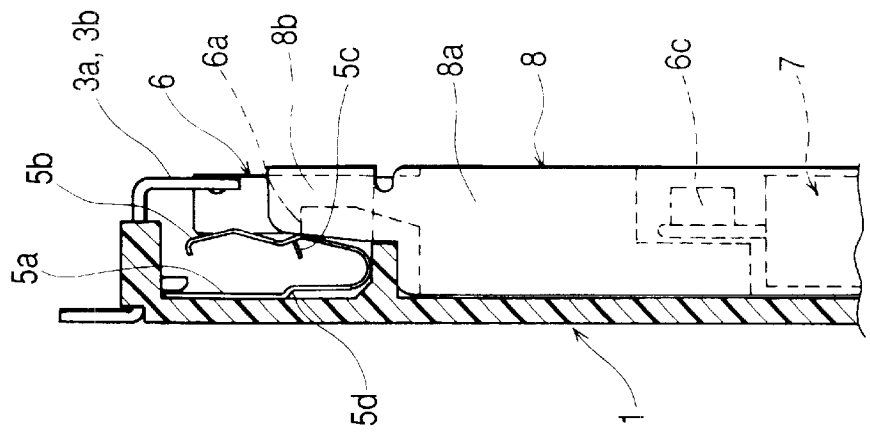
FIG. 22 is a drawing showing the state in which the sliding member has been locked in engagement with the locking member.
Figure 23:
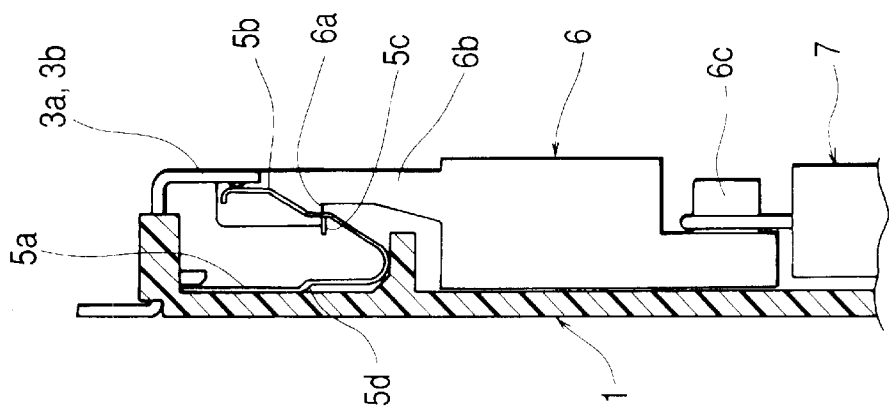
FIG. 23 is a drawing showing the state in which the push rod is pressed and the sliding member is disengaged from the locking member.

FIGS. 19 to 25 illustrate engagement and disengagement between the sliding member and the locking member of the card connector of the present invention; FIG. 19, a state in the course of card insertion into the housing; FIGS. 20 and 21, the states of the detection switch being turned off in the course of card insertion; FIG. 22, the state in which the sliding member is locked in engagement with the locking member; FIG. 23, the state in which the push rod is pushed and the sliding member is disengaged from the locking member; FIG. 24, the state in which the sliding member is unlocked and a card is being ejected; and FIG. 25, the state in which, when the card is being ejected, the push rod returns to its initial position upon return of the sliding member.

The card 4 is inserted in the housing part 1a of the housing 1. At this time, the card abutment 6c of the sliding member 6 abuts a front edge of the card 4 and the card abutment 6c is pushed in a card insertion direction. (FIG. 17)

As the card abutment 6c is pushed in the card insertion direction, the sliding member 6 moves in the card insertion direction against an energizing force of the return spring 7. In this state, since the engaging arm 6b of the sliding member 6 is away from the locking member without being abutted against it, and the moving contacts 5b of the locking member 5 and a pair of the fixed contacts 3a and 3b are in contact with each other, the detection switch is on. (FIG. 19)

Next, when the card 4 is pushed in the insertion direction against the energizing force of the return spring 7, the sliding member 6 moves in the card insertion direction and the tip of the engaging arm 6b abuts the upper face of the locking member 5. (FIG. 20)

The moving contacts 5b are formed on the upper face of the locking member 5, and the engaging arm 6b pushes the upper face of the locking member 5, with result that the moving contacts 5b are elastically deformed downward so that the tips of the moving contacts 5b separate from the pair of the fixed contacts 3a and 3b. Consequently, the detection switch goes off. (FIG. 21)

When the card 4 is further pushed in the insertion direction, the sliding member 6 moves in the card insertion direction and the engaging protrusion 6a provided in the engaging arm 6b engages with the anchor 5c of the locking member 5, with the result that the sliding member 6 is locked in that position. (FIG. 22)

Consequently, the sliding member 6 is stopped and the card 4 has thus been mounted in the housing 1. At this time, the contacts 4a of the card 4 contact the contact terminals 2a of the housing 1. (FIG. 18)

In this state, since the anchor 5c of the locking member 5 engages with the engaging protrusion 6a of the engaging arm 6b, the moving contacts 5b provided on the upper face of the locking member 5 return upward by dint of elastic force of their own and the tips of the moving contacts 5b contact the pair of the fixed contacts 3a and 3b. Consequently, the detection switch goes on. (FIG. 22)

According to the above-described construction, when the sliding member 6 is moved to a card mounting position as a card is inserted, the locking member 5 for locking the sliding member 6 in the card mounting position is formed from a plate spring made of an elastically deformable metal material, and the plate spring is provided with the moving contacts 5b which is elastically deformed by the engaging arm 6b provided in the sliding member 6. By this construction, since the detection switch is actuated when the engaging protrusion 6a provided in the engaging arm 6b engages with the anchor 5c of the locking member 5, whether the card has been locked in the mounting position can be detected without fail.

Since the locking member 5 is formed from an elastically deformable plate spring which is also used as the moving contacts 5b, the number of parts can be reduced and its construction can be simplified, contributing to miniaturization of the connector.

In the case where the card 4 mounted in the housing 1 is ejected, if the push button 8c of the push rod 8 in a standby position is pushed in the card 4 mounted state (FIG. 18) by a finger to move the push rod 8 up to a push-in position in the card insertion direction, a pair of the operation pieces 8b abut and push the upper face of the locking member 5, resulting in the locking member 5 being elastically deformed toward the lower face thereof. Consequently, the anchor 5c of the locking member 5 is disengaged from the engaging protrusion 6a of the sliding member 6. At this time, the moving contacts 5b also separate from a pair of the fixed contacts 3a and 3b, and the detection switch goes off. (FIG. 23)

The sliding member 6 is moved in a card ejection direction by an energizing force of the return spring 7. The substrate 8a of the push rod 8, formed from a metal plate elongated slimly like a thin plate at one end thereof as shown in FIG. 3, can be disposed so as not to interfere with movement of the sliding member 6. (FIG. 24)

As the sliding member 6 moves in the card ejection direction, the card 4 is also moved in the ejection direction, at which time the contact between the contacts 4a of the card 4 and the contact terminals 2a of the housing 1 is lost. (FIG. 17)

If the pushing of the push rod 8 is stopped, the push rod 8 is returned to its initial standby position by an energizing force of a coil spring (not shown), and thus returns to its initial state. (FIG. 25)

Although, in the above-described embodiment, the locking member 5 is constructed with a U-shaped plate spring made of a metal material, it goes without saying that, without the present invention being limited to this, it may be an L-shaped, arc-shaped, and flat spring member so long as the moving parts 5b elastically deform.

As has been described above, a card connector of the present invention comprises: a sliding member that can move slidably in directions in which a card mounted in or dismounted from a housing is inserted and ejected; a return spring for energizing the sliding member in a card ejection direction; a locking member for holding the sliding member in a position in which the card is mounted, against an energizing force of the return spring; and fixed contacts, wherein the locking member is formed from an elastically deformable plate spring, and the plate spring is formed with an anchor for anchoring the sliding member, and moving contacts that can contact or separate from the fixed contacts, wherein the moving contacts are actuated in accordance with engagement and disengagement between the sliding member and the locking member, and wherein it is detected that the card has been held in a mounting position when the sliding member has been anchored to the anchor of the locking member. By this construction, since the detection switch is actuated when the sliding member engages with the anchor of the locking member, whether the card has been locked in the mounting position can be detected without fail. Also, since the locking member is formed from an elastically deformable plate spring which is also used as the moving contacts, the number of parts can be reduced and its construction can be simplified, contributing to miniaturization of the connector.

Fixed contacts opposite to the moving contacts are formed in the housing, and as the sliding member moves to a card mounting position, the sliding member pushes the plate spring so that the moving contacts and the fixed contacts contact or separate from each other. By this construction, contact of the detection switch can be stabilized and the mounting of a card can be detected without fail.

The fixed contacts consist of first and second fixed contacts, and the moving contacts contact or separate from the first and second contact as the sliding member moves. By this construction, even if the moving contacts elastically deform in tilted position, the multiple contacts at their tips ensure stable contact.

The locking member is formed from a U-shaped metal plate, one piece thereof disposed at the upper face side is bifurcated opposite to the first and second fixed contacts, and the anchor is formed in the bifurcated notch. Thereby, with a simple construction, an engaging protrusion of the sliding member can be anchored without fail.

The locking member is bent to the U-character shape so that one piece thereof disposed at the upper face side is elastically deformable, and another piece thereof disposed at the lower face side is provided with a step bent upward, which provides a gap from the housing so that the other piece can deform elastically. By this construction, as the moving contacts disposed at the upper face side deform elastically, the locking member can also deform elastically at the lower face side of the U-shaped bend, with the result that the engagement between the engaging protrusion of the sliding member and the anchor of the locking member can be made firmer.

A push rod is provided which is disposed so as to move slidably in card insertion and ejection directions and unlocks the locking member to move the sliding member to a card ejection position by a push operation, and the locking member is pushed at one end of the push rod so as to be elastically deformed, whereby a lock between the sliding member and the anchor is undone. Therefore, the lock can be easily undone with a simple construction.

What is claimed is:

1. A card connector comprising:
   a sliding member that can move slidably in directions in which a card mounted in or dismounted from a housing is inserted and ejected;
   a return spring for energizing the sliding member in a card ejection direction;
   a locking member for holding the sliding member in a position in which the card is mounted, against an energizing force of the return spring; and
   fixed contacts;
   wherein the locking member is formed from an elastically deformable plate spring, which is formed with an anchor for anchoring the sliding member, and moving contacts that can contact or separate from the fixed contacts,
   wherein the moving contacts are actuated in accordance with engagement and disengagement between the sliding member and the locking member, and
   wherein it is detected that the card has been held in a mounting position when the sliding member has been anchored to the anchor of the locking member.

2. The card connector according to claim 1, wherein fixed contacts opposite to the moving contacts are formed in the housing, and wherein as the sliding member moves to a card mounting position, the sliding member pushes the plate spring so that the moving contacts and the fixed contacts contact or separate from each other.

3. The card connector according to claim 2, wherein the fixed contacts consist of first and second fixed contacts, and wherein the moving contacts contact or separate from the first and second contact as the sliding member moves.

4. The card connector according to claim 3, wherein the locking member is formed from a U-shaped metal plate, wherein one piece thereof disposed at an upper face side is bifurcated opposite to the first and second fixed contacts, and wherein the anchor is formed in the bifurcated notch.

5. The card connector according to claim 4, wherein the locking member is bent to the U-character shape so that one piece thereof disposed at the upper face side is elastically deformable, and wherein another piece thereof disposed at a lower face side is provided with a step bent upward, which provides a gap from the housing so that the other piece can deform elastically.

6. The card connector according to claim 1, wherein a push rod is provided which is disposed so as to move slidably in card insertion and ejection directions and unlocks the locking member to move the sliding member to a card ejection position by a push operation, and wherein the locking member is pushed at one end of the push rod so as to be elastically deformed, whereby a lock between the sliding member and the anchor is undone.

* * * * *